INVENTOR
ALBERT L. deGRAFFENRIED
BY Leonard H. King
ATTORNEY

Nov. 16, 1965 A. L. DE GRAFFENRIED 3,217,568

DEVICE FOR CONTROLLING DEEP BORING OPERATIONS
IN A ROTATING OBJECT

Filed May 23, 1962 11 Sheets-Sheet 2

INVENTOR
ALBERT L. deGRAFFENRIED
BY Leonard H. King
ATTORNEY

INVENTOR
ALBERT L. deGRAFFENRIED
BY Leonard H. King
ATTORNEY

INVENTOR
ALBERT L. deGRAFFENRIED
BY Leonard H. King
ATTORNEY

INVENTOR
ALBERT L. deGRAFFENRIED
BY Leonard H. King
ATTORNEY

INVENTOR
ALBERT L. deGRAFFENRIED
BY Leonard H. King
ATTORNEY

INVENTOR
ALBERT L. deGRAFFENRIED
BY Leonard H. King
ATTORNEY

INVENTOR
ALBERT L. deGRAFFENRIED
BY Leonard H. King
ATTORNEY

INVENTOR.
ALBERT L. de GRAFFENRIED
BY
Leonard H. King
ATTORNEY.

INVENTOR.
ALBERT L. de GRAFFENRIED
BY
Leonard H. King
ATTORNEY.

INVENTOR.
ALBERT L. de GRAFFENRIED
BY
Leonard H. King
ATTORNEY.

3,217,568
DEVICE FOR CONTROLLING DEEP BORING OPERATIONS IN A ROTATING OBJECT

Albert L. de Graffenried, Roslyn Harbor, N.Y.
(30 Washington Ave., Glen Head, N.Y.)

Filed May 23, 1962, Ser. No. 197,049
22 Claims. (Cl. 77—3)

The present invention relates to a boring tool adapted for deep boring within a rotating object, wherein means are provided for maintaining the track of such boring within close limits, and more specifically, to monitoring and control means for use with a boring tool, to program the configuration of the bore formed in a rotating object.

There has been described in U.S. Patent No. 3,020,786, issued to Albert L. de Graffenried and William A. Folsom, a device for measuring run-out during a deep boring operation. This device indicates the radial distance from a center line of rotation to the center of a bored hole. The invention may be employed in connection with elongated cylindrical objects having a bore, such as naval gun barrels and the like. In the boring of a work piece which is very slender, such as a gun barrel, the work piece is generally rotated at constant speed and the boring tool is gradually fed into the work along the center line of rotation by a boring bar. Since the rough bore in the work piece is long and slender, the boring bar must be likewise. In many instances, after the boring tool has proceeded approximately a quarter of the distance down the barrel, it begins to drift gradually away from the center line of rotation of the barrel. This tendency to drift is apparently random and as yet not well understood. In many cases, the run-out becomes excessive and ruins the work piece.

In the application above alluded to, sensing means are provided whereby an electrical output proportional to the amount of such run-out is derived, with means to give warning when this run-out exceeds a predetermined limit. The basic principle involved during run-out is that the boring tool in such case is radially displaced from the center line of rotation and orbits about the center line of rotation of the work. This orbital movement is measured by sensing means, such as a pendulum disposed at the boring head, and the angular displacement of the pendulum is converted to an electrical signal as by the use of a rotary variable differential transformer. This device produces an output voltage proportional to the angle through which its rotary shaft is turned from a reference position on its frame. Thus, the radial displacement of the cutting bit carried by the boring head can be measured, as described in the aforesaid application. Where this exceeds a predetermined limit, alarm means may be actuated.

It is contemplated in the present invention to use a run-out signal to provide monitoring and control means whereby the location of the boring tool can be programmed relative to the rotating object in which the boring tool is placed, to control the path of this boring tool within very close limits, and therefore control the configuration of the cut made by such a tool. It will be apparent that a primary advantage of such control is to provide a means for continuously restraining run-out to a negligible value during the boring, by supplying a restoring force which continually holds the boring tool on the center line of rotation. In addition to this, however, it may be desired to bore a hole having a center line of predetermined curvature, such as a serpentine bore, or in addition, a bore having axial variations of diameter as well as peripheral variations. That is, it may be desired to provide a keyway located at a given radial angle and having axial variations of diameter, that is, variation along the "Z" direction. Thus, means for programming the position of the boring tool, which determines the shape of the bore made, is envisioned in the device of the present invention. A large work piece can thereby have a deep bore formed therein with very close tolerances and full control at all times, although the structure is inaccessible to direct measurement and inspection without costly shutdown and delay. Using control means of extreme simplicity and flexibility, as provided for in the present invention, an almost infinite variety of arrangements for programming peripheral and axial profiles is made possible.

It is therefore a primary object of the present invention to provide means for improving the accuracy of a deep boring operation in a rotating object such as a gun barrel or the like.

It is another object to provide the capability of performing complex boring operations.

It is a further object of the present invention to provide display means for indicating the magnitude and direction of run-out relative to a radial reference line on the work piece.

It is yet a further object of the present invention to provide means for continuously restraining run-out to a negligible value during deep boring by the use of servo mechanism means to generate a restoring force adapted to continually hold the boring tool on the center line of rotation.

It is yet a further object of the present invention to provide means for programming the track of a boring tool relative to the center line of rotation to permit controlled excursions from such center line, such as when boring serpentine holes, or the like.

It is yet a further object of the present invention to provide means for varying the axial and peripheral dimensions of a deep bore formed in a rotating object.

These and other objects and advantages of the present invention will be apparent from the following description and the drawings appended thereto in which.

Figure 1:
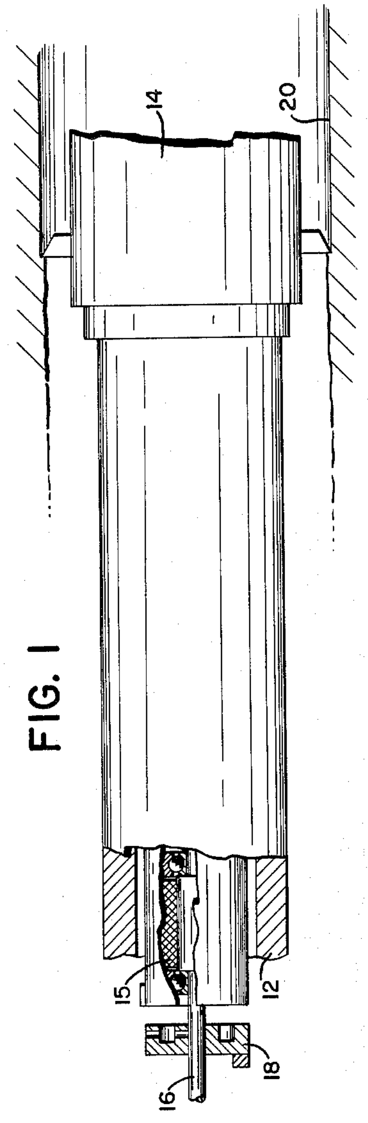
FIG. 1 is a perspective view, partly broken away, of the sensing means employed in a device of the present invention.
Figure 2:
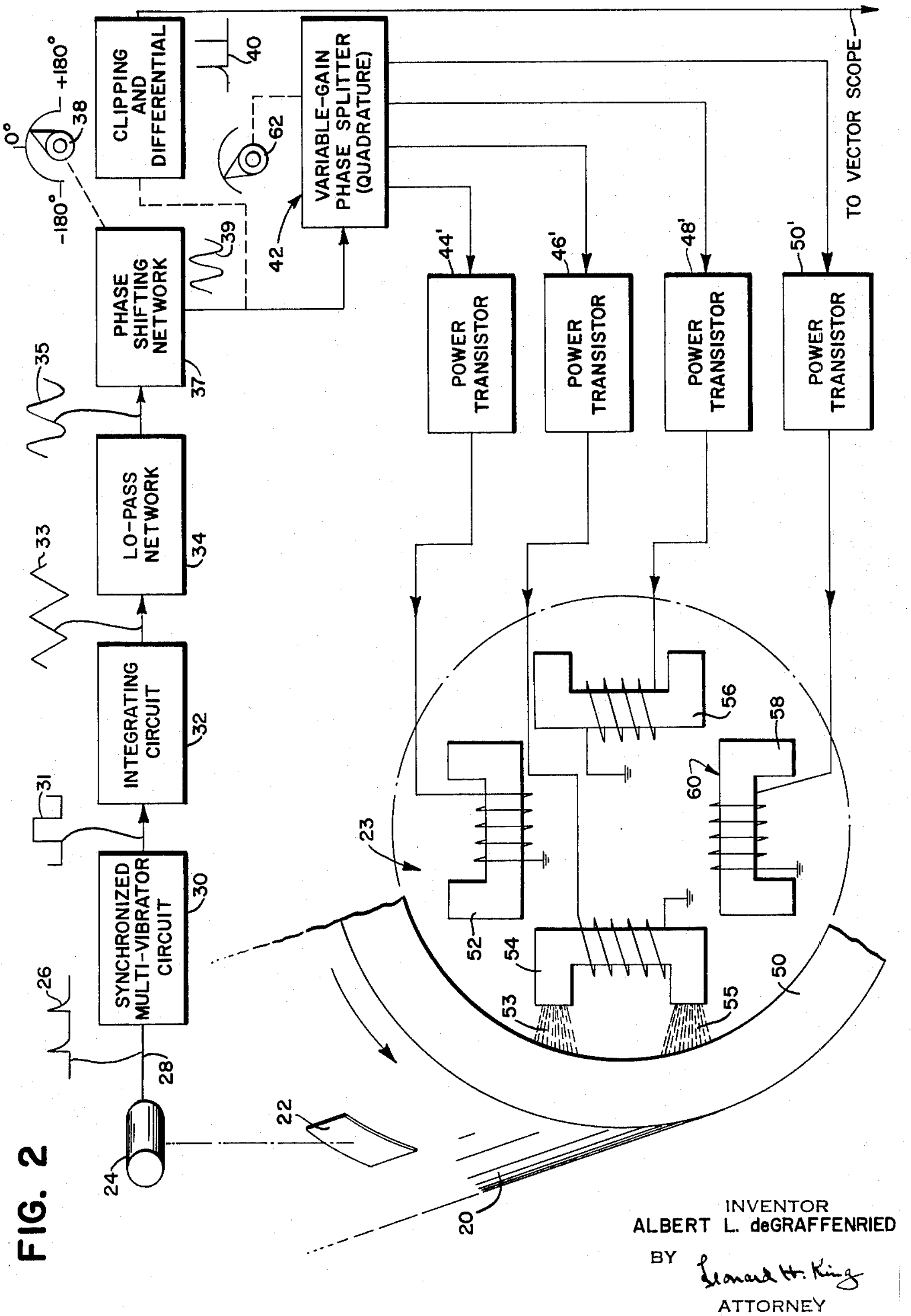
FIG. 2 is a diagrammatic representation of the device of the present invention.

Referring now to the figures, there is shown in FIG. 1, a schematic representation of the run-out sensing means explained in detail in the aforesaid Patent No. 3,020,786. Sensor 10 is sealed within a steel cylinder 12 which is mounted to the boring head 14 of the boring tool means. Rotary transformer 15 is provided with a shaft 16 which supports a seismic pendulum 18. When the position of the boring head is such as to coincide with the center line of rotation of the rotating barrel 20, little or no motion is imparted to the pendulum. Upon occurrence of run-out, the boring head, as well as the sensor, orbits about the center line of rotation, producing oscillation of the pendulum which serves to alter the coupling of the transformer, and by means well known in the art, an output signal proportional to the angle of displacement of the pendulum will be generated. This angle is proportional to the amount of horizontal displacement of the bore from the center line, i.e., it is a measure of the run-out. To display this visually, as on a phase-monitoring scope, a reference signal is necessary. As shown in FIG. 2, a small piece of transformer lamination 22 is attached in some suitable manner to the outside surface of the gun barrel 20. A variable reluctance sensor 24 is positioned to generate a sharp voltage pulse 26 each time the lamination passes the face of this sensor.

Figure 3:
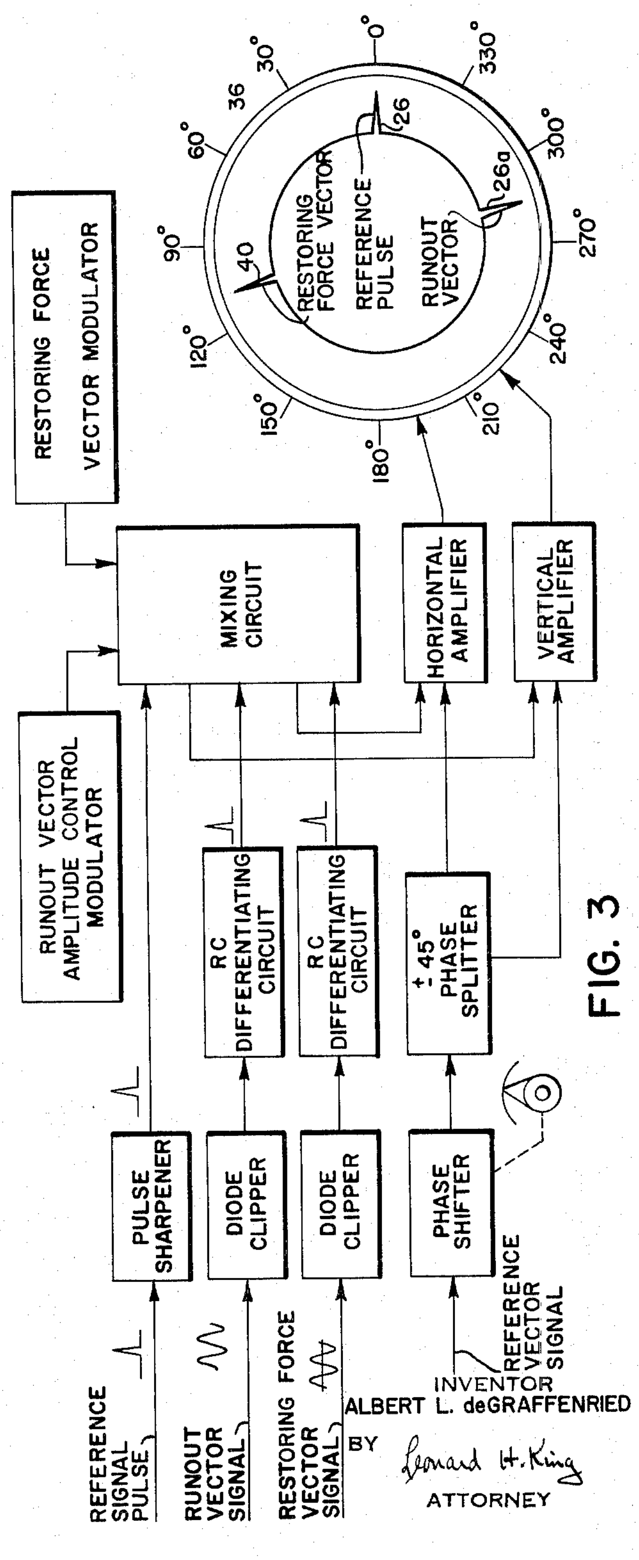
FIG. 3 is a plan view of the polar vectorscope used in the present invention.

Pulse 26 is transmitted along conductor 28 to a free running multivibrator 30 which is adjusted to run at a frequency approximately equal to that of the barrel vibration. The pulse synchronizes the multivibrator to the barrel rotational frequency. The output of multivibrator 30 is a synchronized train of square waves 31 which are integrated by a long time-constant circuit 32 into triangular waves 33. These triangular waves are passed through a low pass R.C. network 34 where the third and higher odd harmonics are severely attenuated leaving the fundamental only, namely, a train of sinusoidal waves 35 at the barrel of rotation frequency. As shown in FIG. 3, pulse 26 is also displayed on polar vectorscope 36 having a circular sweep synchronized at the barrel rotational frequency, with the reference pulse set at the zero position, namely, at the beginning of the sweep. Here a circular sweep is preferable to a linear sweep, since it gives an accurate physical representation of the boring operation, hence aids personnel in monitoring. As shown in FIG. 3, the trace is a circle traced out at the rotational speed of the gun barrel, with three pips on it, e.g., the reference vector, the run-out vector, and the restoring force vector.

The run-out appears as a sinusoidal modulation of the carrier frequency derived from the rotary transformer as modulated by the pendulum motion. This modulation frequency corresponds to the rotation of the barrel, and has a magnitude corresponding to the amount of run-out. This sinusoidal wave is clipped and differentiated to form a sharp pulse **26*a* by circuit means well known in the art. Pulse 26*a*** is displayed on the scope at a position corresponding to the angular displacement of the run-out vector relative to the reference radial line. Since this is relatively constant, generally changing very slowly as the boring tool is moved axially down the gun barrel, it will be apparent that the position of this run-out can be monitored at all times on the scope.

Having determined the existence and the orientation of the run-out, there is contemplated in the present invention the providing of a restoring force, whereby the boring tool can be returned to the center line of rotation. It is first necessary to generate a pulse at a point corresponding to a selected peripheral position on the barrel, at a known angular deviation from the reference radius. This is accomplished by passing reference sine wave 35, FIG. 2, through phase-shifting network 37. By adjusting phase-shift control 38, it is possible to vary the phase angle $\theta$ through the range $-180°$ to $+180°$ relative to the reference sine wave which, as stated hereinabove, is set by the location of the lamination. This phase-shifted sinusoidal voltage 38 represents the restoring force, to be applied to the boring tool, as described in greater detail hereinbelow. However, as shown in FIG. 3, this restoring force signal is also displayed on polar vectorscope 36. In FIG. 2, the phase-shifted sine wave 39 is clipped and differentiated to form a pulse 40 which is displayed on polar vectorscope 36 of FIG. 3 simultaneously with the reference and the run-out vector. Thus, the angular relationship between these vectors is readily apparent, for monitoring purposes. It will be noted that the restoring force vector is substantially 180° away from the run-out vector, though this need not always be the case as will be explained hereinbelow. This restoring force vector may be considered as an input command signal.

As shown in FIG. 2, the phase-shifted signal voltage is then fed to a quadrature type phase-splitting circuit 42. This circuit splits the signal in four equal components differing in phase by 90° electrically. These phase quadrature components are fed individually to separate power transistor stages, 44′, 50′ which are biased class B, that is, at cut-off. The output current of these stages therefore flows only during one-half of the original input cycle, peaking sequentially. The power transistors are individually coupled to electromagnets 52, 54, 56 and 58, which are arranged at space quadrature about the boring bar just behind the boring head in the form of a control yoke 60, as shown diagrammatically in FIGS. 4 and 5. Since current flows sequentially over only half of each cycle in the power transistors, then the associated electromagnets are energized sequentially so as to produce a rotating magnetic field which proceeds in the same rotational direction and at the same rotational speed as does the barrel about the boring tool. The effect of this is to convert the boring tool to an electromagnet of a duration and a direction established by the energization of the electromagnets. Thus, the gun barrel "sees" an electromaget only at the point where such magnetization exists.

Figure 9:
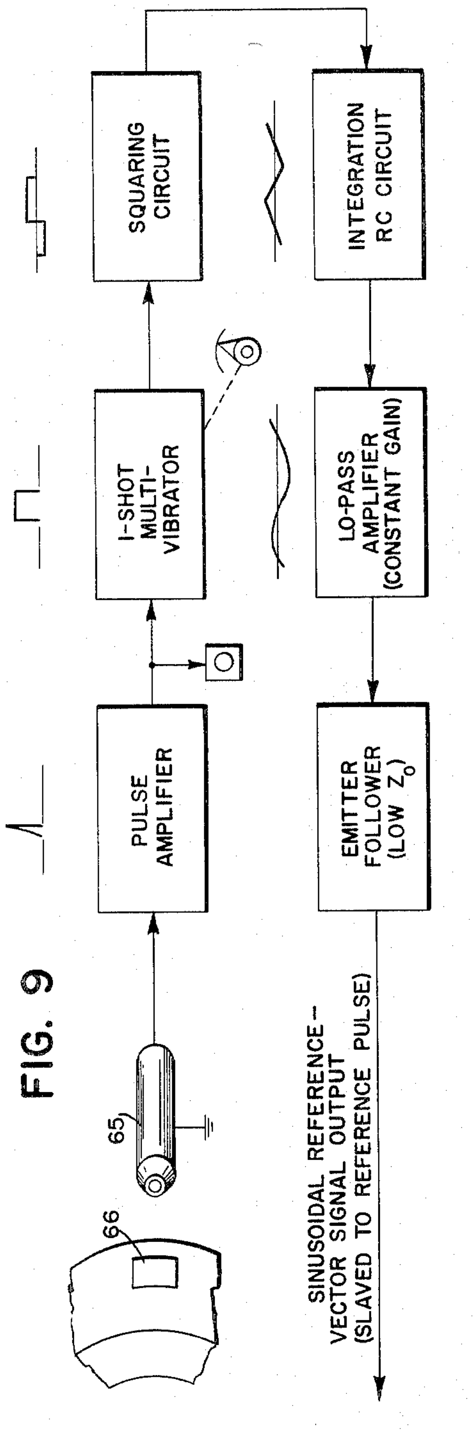
FIG. 9 is a diagrammatic representation of an alternative embodiment of the reference pulse signal generator employed in the present invention.
Figure 19:
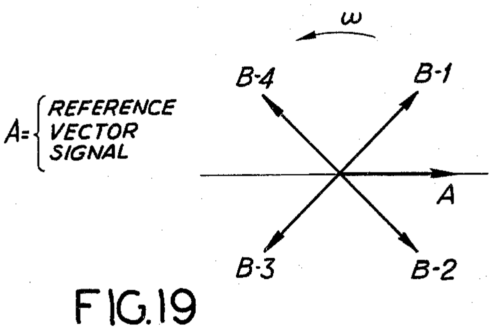
FIG. 19 is a vector diagram showing the reference signal vector.

In FIG. 19 there is shown vector "A" which is a sinusoidal reference-vector signal voltage generated as shown in FIG. 9. Reference vector voltage "A" rotates at rotational speed omega, which is the rotational speed of the gun barrel or workpiece.

Figure 20:
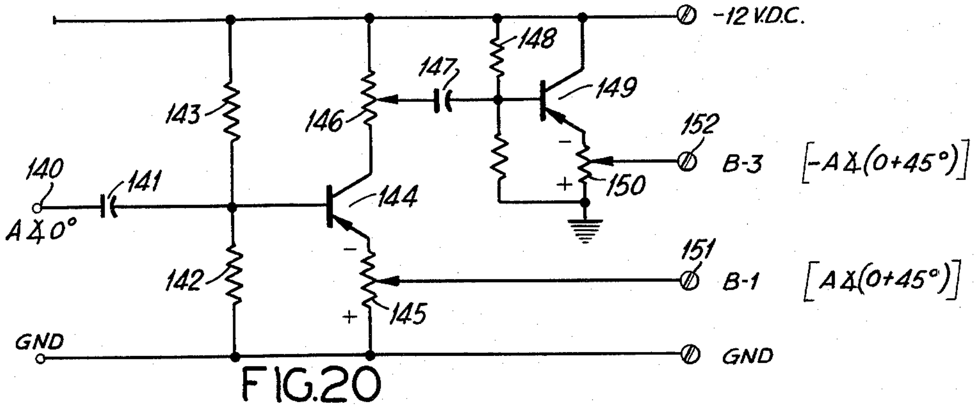
FIG. 20 is a schematic diagram of a conventional phase-splitting circuit.
Figure 21:
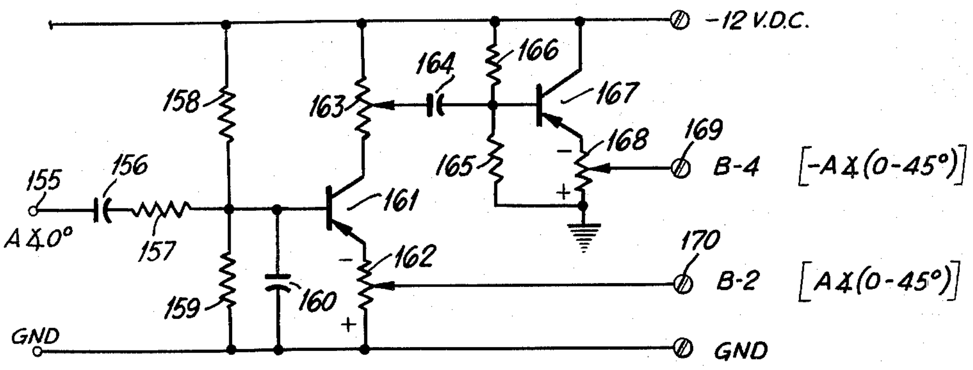
FIG. 21 is a schematic diagram of another conventional phase-splitting circuit.
Figure 22:
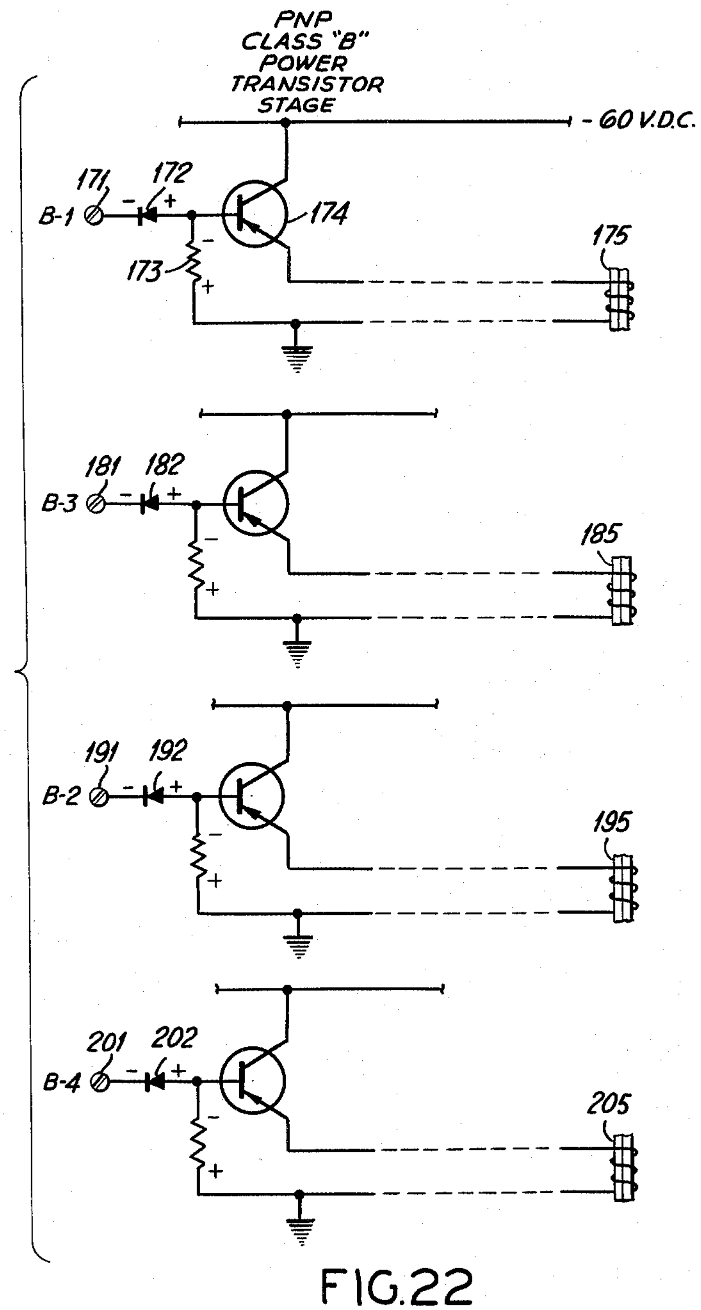
FIG. 22 is a schematic diagram of a plurality of typical class B power transistor amplifier stages.
Figure 23A:
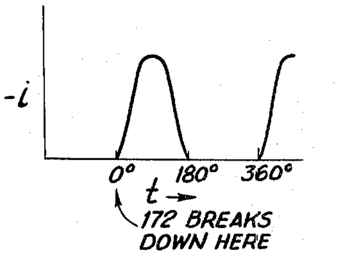
FIGS. 23A–23D show the relative waveforms for class B stages of FIG. 22 at a given instant.
Figure 23B:
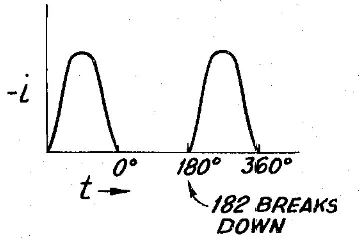

Voltage "A," the reference-vector signal voltage, is applied to the circuit of FIG. 20 between terminal 140 and ground, and, by means of RC circuit 141, 142 is advanced electrically 45 degrees to poistion B–1 of FIG. 19. Transistor 144 is a phase-inverter stage. The voltage across resistor 145 is in phase with vector B–1 while the voltage across resistor 146 is 180 degrees opposed, thus supplying vector B–3 of FIG. 19. Transistor 149 is simply an emitter follower stage which provides vector voltage B–3 at low impedance suitable for driving the next stage. FIG. 20 illustrates one means of generating opposed vector voltages B–1 and B–3. FIG. 21, in an almost identical manner, generates vector voltages B–2 and B–4. Note, however, that in this case although "A" voltage is applied to terminals 155 and ground, components 157, 158, 159 and 160 are selected so as to retard "A" by 45 degrees electrically. At terminals 169 and 170 vector voltages B–4 and B–2 therefore appear. Thus, there is now available vector voltages B–1, B–2, B–3, and B–4, all at phase quadrature as shown in FIG. 19. These four voltages each are individually applied to a circuit such as shown in FIG. 22. Referring to FIG. 22, voltage B–1 applied directly to terminal 171 and ground, sees an open circuit, until B–1 goes negative. Then the diode 172 conducts and allows power transistor 174 to be driven up out of cutoff, thereby energizing electromagnet 175 with a half-sine wave pulse of current, as shown in FIG. 23A. This pulse of current persists for a time equal to 180 electrical degrees of rotation of the reference-vector voltage, and therefore for a like interval relative to the rotation of the workpiece. Voltage B–3, being opposed to B–1 (as shown in FIG. 19), its current pulse occurs 180 electrical degrees later, as shown in FIG. 23B. Since B–1, B–2, B–3 and B–4 voltages are each individually applied to separate circuits, the result is four electromagnets which are current-pulsed, in succession, with a half-sine wave of current once each during each revolution of the vector voltage "A" of FIG. 19.

Since the gun barrel is of a magnetizable material and a magnetic field has been established in the magnetized area between the boring tool and the barrel, it will be apparent that the magnetic force will be such as to attract the barrel to the tool. It should be noted that for non-ferrous electrically conducting materials, the use of 10 kc. eddy-current magnets is feasible, and will accomplish the same result. However, due to the far greater weight of the barrel than the tool, and since the barrel is cradled for rotational motion but not for lateral motion, it is the boring tool that will be displaced by the magnetic field and moved towards the barrel. The effect of the rotational magnetic field, synchronized with the rotation of the gun barrel about the boring tool, is to move the boring head in a direction relative to a reference point on the gun barrel so as to correct the run-out.

Figure 6:
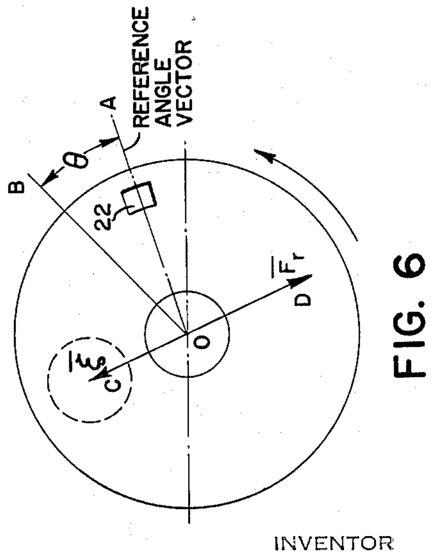
FIG. 6 is a vector diagram of a run-out condition, shown in relation to the center line of the gun barrel.

FIG. 6 shows a condition of run-out existing on the line $\overline{OC}$ with bore center at C. It will be appreciated that it is shown in an exaggerated form for purposes of illustration. A restoring force signal must then be applied along the line $\overline{OD}$, approximately 180° displaced from line $\overline{OC}$. The boring tool center remains at C which orbits around O. However, the magnetic fields in the electromagnets rotate about boring head 14 in a direction and at a speed such that a fixed relation exists between C and D with each electromagnet being energized in turn, to maintain the relation between C and D as C orbits. Thus C is magnetically forced at all times towards D, which action returns the bore center C towards O. This is the corrective action that is desired. As provided in the present invention, this can be adjusted manually.

The run-out vector $\overline{OC}$ appears on the scope (FIG. 3) as an angular deviation from the reference vector $\overline{OA}$. The operator manually inserts the corrective signal $\overline{OD}$, herein indicated as $\overline{F}_r$, which nulls the run-out vector $\overline{E}$. This is an input command signal. It will be appreciated that $\overline{OA}$ is determined by lamination 22 and is displayed in the zero position on the scope by appropriate setting of the calibration controls of the scope. After correction, run-out may again appear in a random fashion herein shown as angle $\theta$. In each case, a manual reset is necessary to get a corrective angle equal and opposite to $\theta$. Thus the operator, knowing the position and magnitude of the run-out vector, can adjust the phase-shifting control 38, FIG. 2, until the restoring force vector acts upon the boring bar in a direction opposite to that of the run-out vector. In this way, run-out correction is initiated. The rate at which the run-out vector disappears depends on the magnitude of the restoring force. This magnitude can be adjusted using gain control 62 (see FIG. 2) which varies the amplitude of all the quadrature components simultaneously.

Figure 5:
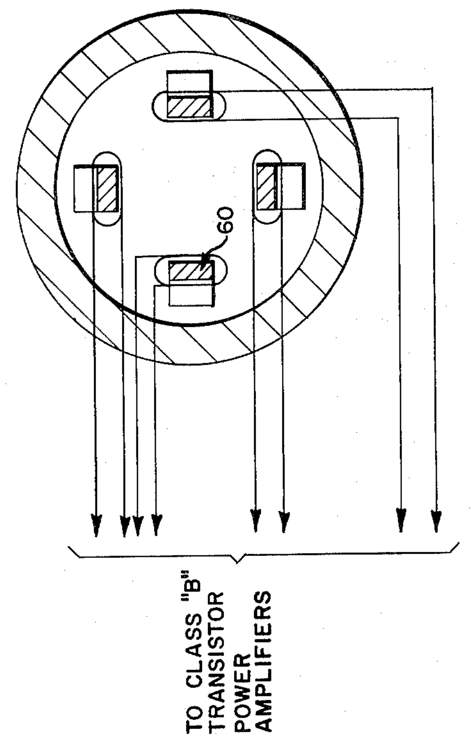
FIG. 5 is a view taken along line 5—5 of FIG. 4.
Figure 4:
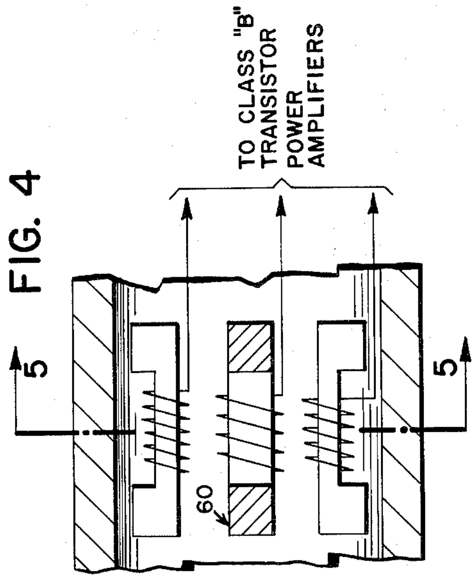
FIG. 4 is a simplified representation of the electromagnets used in the present invention shown in side view.

As shown in FIGS. 4 and 5, the restoring force yoke consists of four electromagnets using C-shaped laminations which are rather shallow in order to be positioned between the boring head and the inside surface of the bored out barrel. The pole faces face outward from the boring bar and since these will be only a few thousandths of an inch from the inside surface of a bored barrel, an attractive force equivalent to 1000 lbs. or more can be created with a current of several amperes in the electromagnets. The electromagnets are wired so that the fluxes peak consecutively, to produce a rotating force vector about the boring bar in synchornism with the rotation of the gun barrel.

Figure 7:
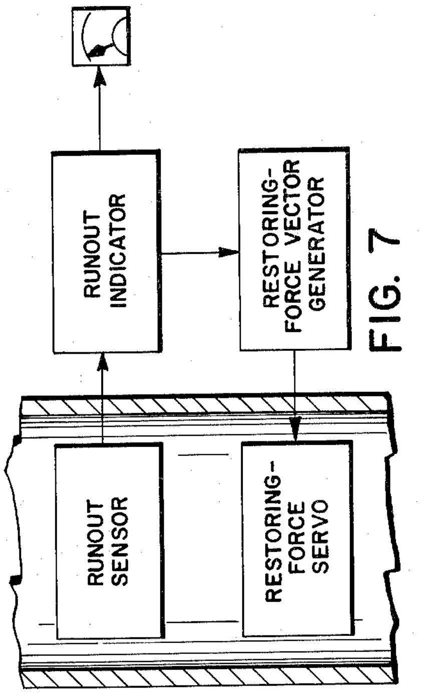
FIG. 7 is a diagrammatic representation of the negative feedback system of the present invention.
Figure 8:
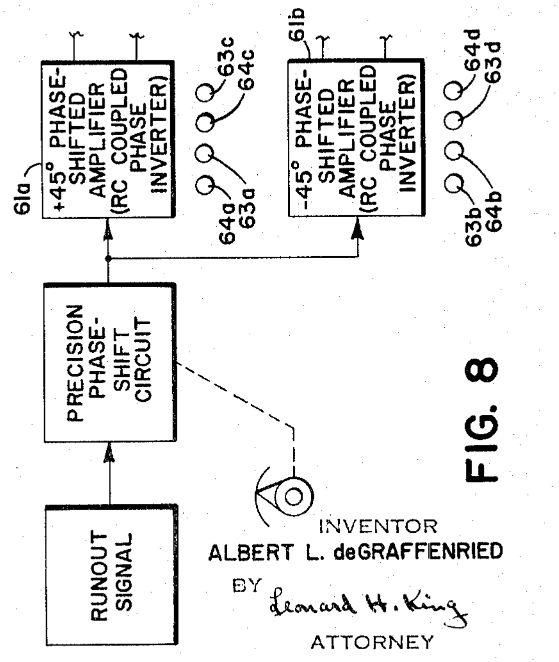
FIG. 8 is a diagrammatic representation of the restoring force vector signal generator used in the present invention.

It will be apparent that the direction of the restoring force vector must be such as to continually oppose the run-out vector. Thus, it is feasible to utilize a conventional servo mechanism which provides to the restoring yoke a signal 180° opposite from the run-out vector. As shown in FIG. 7, the previously mentioned phase-shift circuit may be replaced by an inverting circuit and the resultant signal fed to the boring tool. In such an application, the restoring force vector is phase-shifted from the run-out signal, instead of being phase-shifted from the reference signal. This has the added advantage of automatically providing a signal of the correct magnitude, namely, one equal and opposite to the error signal. However, it has been found in practice that slight dissymmetries of the tool head may require that the restoring force be other than 180° away from the run-out vector for best performance. As shown in FIG. 8, a continuously variable phase-shift is therefore provided whereby the optimum position for the restoring force vector may be found by actual adjustment, with means for adjusting the individual quadrature circuits. Thus, trim potentiometers **63*a*–63*d* and screw drive adjustments 64*a*–64*d*, in restoring force vector signal generator 61*a*–61*b***, provide for trimming the phase shift of each of the channels. It will be appreciated that in the machining of a long gun barrel, monitoring of the amount of run-out vector at all times is a wise precaution. Hence, the polar vectorscope and associated phase control circuits are contemplated as likely essential features of the present invention.

Figure 24:
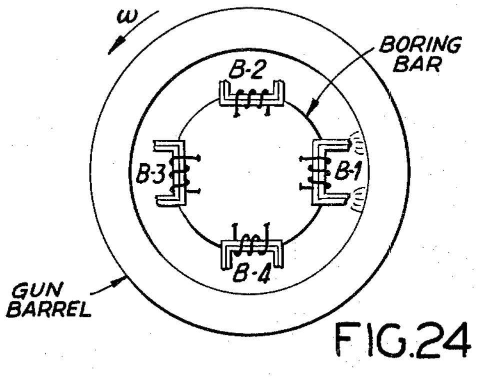
FIG. 24 is an end view of a gun barrel showing the boring bar and controlling electromagnets.
Figure 25:
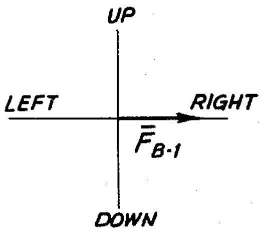
FIG. 25 is a vector diagram of the forces acting on the boring bar.
Figure 26:
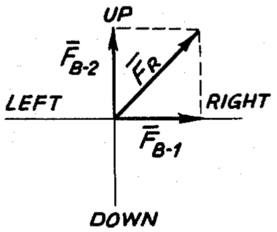
FIG. 26 is a vector diagram of the forces acting on the boring bar under another condition than that of FIG. 25.
Figure 23C:
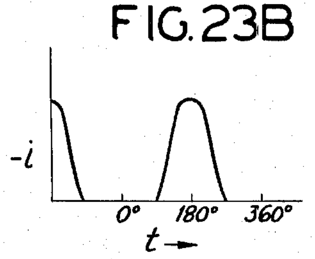
Figure 23D:
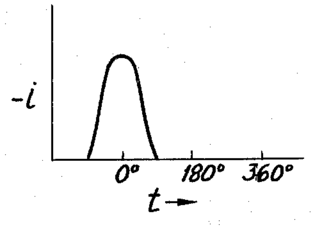

FIG. 24 shows, in cross-section, the four abovementioned electromagnets arranged around and secured to the boring bar of a deep-boring lathe. The four electromagnets form a yoke about the boring bar. This yoke is mounted immediately behind the boring head. The work piece is shown in this case as a gun barrel, and it rotates at speed omega, counter-clockwise. For illustration purposes, let it be assumed that electromagnet 175 is at the peak of its current pulse; this would correspond to 90 electrical degrees in FIG. 23A. All other electromagnets are quiescent at this instant so the only force acting on the boring bar at this instant is a force to the right as shown in FIG. 25, namely $F_{B-1}$. After a time equal to ⅛ cycle of omega, that is, 45 electrical degrees, the current in 175 electromagnet will have decreased while the current in 195 will have increased, as is clear from a comparison of FIGS. 23A and 23C. This means that electromagnets 175 and 195 are each generating a force on the boring bar as shown in FIG. 26, so the total force on the bar is the vector sum $F_{B-1}+F_{B-2}=F_R$. Notice that the resultant force on the boring bar has moved 45 degrees counterclockwise. It is now recognizable that the yoke crudely resembles a stalled A.-C. induction motor; there are, however, two distinctive differences:

(a) current flows through these electromagnets in one direction only; and (b) the force generated by each of these electromagnets is in the radial direction.

The result of all the above is a rotating, radially-outward force acting upon the boring bar. Since this rotating radial force is derived initially from the reference-vector signal voltage, it is slaved to it, rotates in synchronism with it, and may be positioned angularly with respect to it by varying the precision phase-shift circuit indicated in FIG. 8. Consequently, the boring machine operator can always position this force $F_R$ approximately in the opposite direction to the runout vector ($\xi$) as illustrated in FIG. 6, in order to move the boring bar back toward the centerline-of-rotation of the workpiece while the workpiece is rotating.

If one now simply substitutes the runout vector signal in place of the reference vector signal, then two very useful features appear:

(a) the magnitude of the restoring force $F_R$ acting on the boring bar becomes proportional to the magnitude of the runout $\xi$; and (b) no matter what orientation the runout vector may take now, the restoring force, $F_R$, is always opposed to it, that is, 180 degrees out of phase with the runout vector, once so set.

Figure 10:
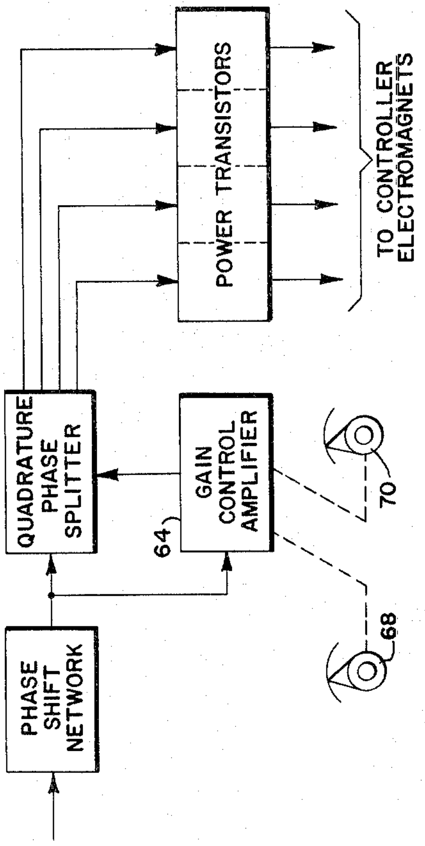
FIG. 10 is a diagrammatic representation of the gain control circuit employed in the present invention.

As shown in FIG. 9, in alternative embodiment of the reference pulse signal generator employs a photo device 65 whereby a strip of reflective material, such as white tape 66, is affixed to the outside surface of the rotating barrel and serves as a light source. This passes under the light sensitive device, which generates a sharp pulse at each pass, to mark the reference position of the barrel. Such a pulse has a rise time of a few microseconds and is used to synchronize a multivibrator, as described hereinabove, to generate the reference sine wave output (upon proper integrating and low-pass-network wave shaping) by circuit means well known in the art. As shown in FIG. 10, means are provided for a gradual return of the boring tool to the center line of rotation, in the event that a large run-out should suddenly occur. Gain control amplifier 64 operates to reduce gains at higher signal levels using an automatic volume control circuit and a rate-of-change limiter. Each of these controls are adjustable, by means of amplitude taper control 68 and time constant control 70. This assures that the axis of the bored hole will have a very gradual curvature in returning to the center line so that projectiles speeding therethrough will not bind or wedge. True runout signal is defined as a sinusoidal signal, the amplitude of which is directly propositional to the actual runout ($\xi$) of the boring head, and the direction of which (with respect to the reference vector) indicates the direction of the center of the boring head from the center-of-rotation of the workpiece.

Synthetic runout signal is defined as a signal which is generated by taking a portion of the reference-vector signal voltage and changing its phase and amplitude according to some pre-selected program. This synthetic runout signal voltage is injected into the closed-loop system of the runout controller in such a way that, by use of the summing circuit, the resulting true runout can null out the synthetic runout signal, and preserve null balance for the overall system (at terminals 262 and 263).

Figures 11, 11A:
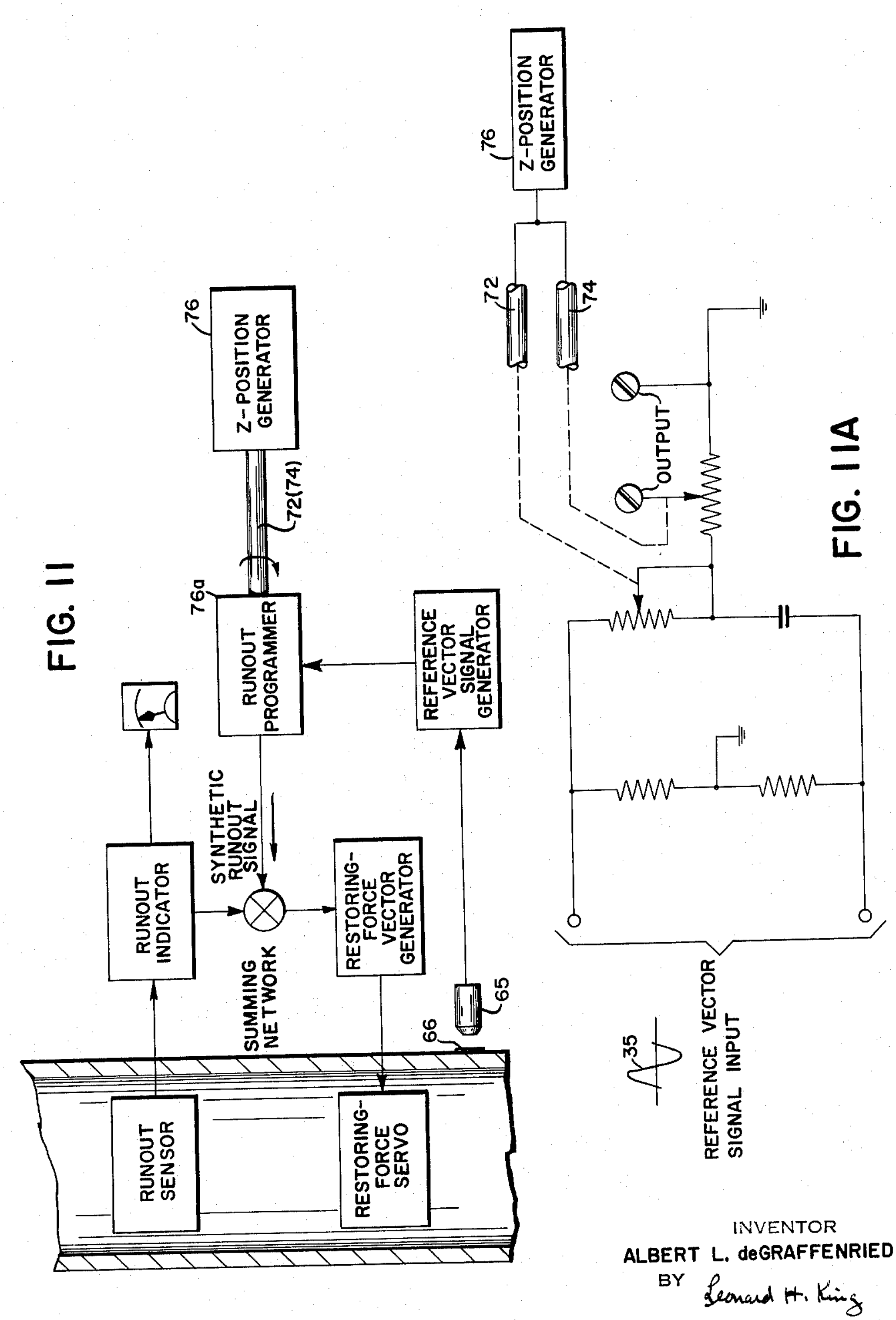
FIGS. 11 and 11A are diagrammatic representations of the programmed system and a programmer, respectively, used in the present invention.

It will be seen therefore that a restoring force can be created from the run-out signal. Using this principle, a synthetic or injected run-out signal may be introduced instead, which the bore can respond to as an input command signal; hence the borer can be provided with a curvature depending on the nature of the programmed restoring force signal, fed to the yoke formed about the boring tool. Utilizing this principle, it is contemplated in the present invention to provide means for boring holes in large rotating objects, such as gun barrels or the like, wherein different configurations are turned out by the boring tool, depending on the programming. Thus, by the above-described system, which may be called a center line rider system, it is possible to bore precisely on the center line, holding the run-out to a negligible value all along the center line of rotation of the work piece. However, it is useful in some situations to be able to bore a hole having a predetermined curvature. Such a bored hole may be considered as having run-out as a function of depth, the run-out being measured always from the center line of rotation of the barrel. For example, it may be desired to control the boring tool so as to bore a hole with a serpentine center line. It will be recalled that the restoring force vector is closely dependent on the run-out vector, being proportional to and opposite, with minor adjustments in phasing made necessary by the dissymmetry of the boring tool. Thus, the correction input signal will involve a known magnitude representing the run-out distance $\overline{OC}$ in FIG. 6, and a known direction $\theta$ with respect to some reference line, $\overline{OA}$. However, an injected signal can be programmed using a preselected magnitude, i.e., the amount of current fed to the yoke, 52–56, about the boring tool which determines the intensity of the magnetic field, and a preselected direction, as determined by the phase-shifting circuits. To the boring tool, this injected signal appears as an additional runout, hence the boring tool responds to this injected signal, as explained hereinabove. This can be accomplished, as shown in FIG. 11A, by using two tapered potentiometers 72, 74, which operate as a programmer, having their shafts driven in tandem by "Z" generator 76; i.e., the radial position of the bored hole cut made by the boring tool is accurately slaved with the axial movement of the boring tool down the rotating gun barrel. Alternatively, curve followers can be used instead of the two tapered potentiometers, as will be appreciated by those familiar with the art, where curves presenting desired magnitude and direction of run-out are drawn on graph paper and the sheets fitted onto the curve follower (X–Y recorder). Thus, the bore cut into the gun barrel will be determined by the phase and amplitude of the synthesized restoring force signal given to the summing network.

FIG. 11 shows a runout indicator feeding a summing network directly below it. In U.S. Patent No. 3,020,786, by de Graffenried et al., it is shown that the modulation on the carrier signal coming from the pendulous sensor is electrically the equivalent of the mechanical runout of the boring bar. This is so, since:

(a) the frequency of the modulation is equal to the frequency of rotation of the mechanical runout vector $\xi$; and (b) the amplitude of the modulation is proportional to the amplitude of the mechanical runout vector. It is this runout vector signal which is fed from the runout indicator box to the summing network box therebelow, in FIG. 11.

Example: Deep boring of a 90 mm. gun barrel 16 feet long is usually carried out at 2.33 revolutions/second. The runout vector ($\xi$) rotates at this speed and may typically range from .005 inch to .080 inch amplitude.

Ordinarily the runout indicator would feed its runout signal directly to the restoring-force vector generator described above, and the resultant closed-loop null balance system would hold the runout essentially to zero; such a system is shown by the block diagram of FIG. 7. However, if for some reason it is not desired to bore a hole which is serpentine, that is, not always concentric with the centerline-of-rotation of the workpiece, then the closed-loop system may be deceived by injecting a synthetic runout signal (as shown generally in FIG. 11) by means of the summing network described below.

Figure 27:
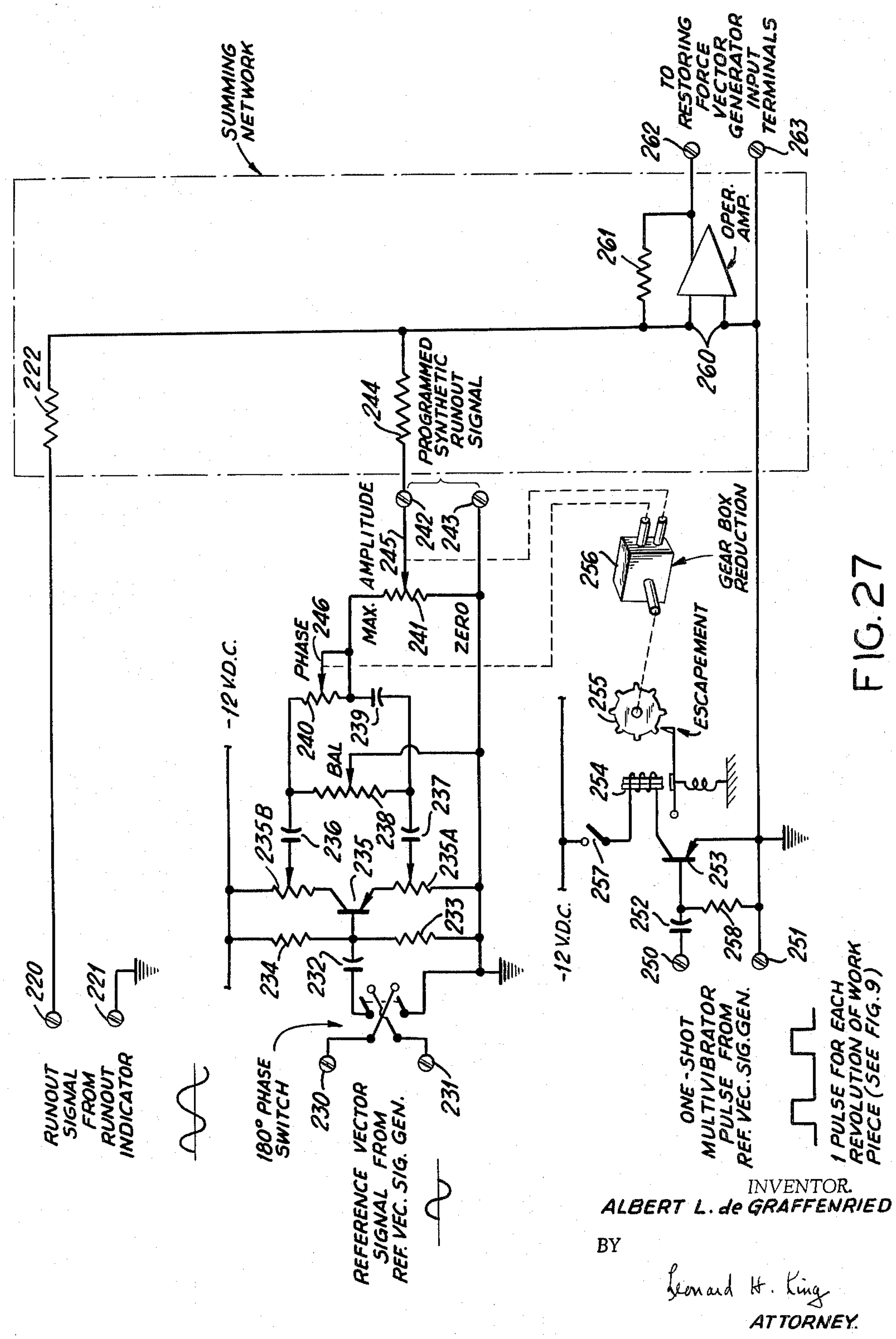
FIG. 27 is a schematic drawing of the runout programmer of FIG. 11.

Referring now to FIG. 27, if there is zero voltage appearing across potentiometer 241, then the only signal reaching terminals 262, 263 is the runout signal coming from terminals 220, 221. Under this condition, the system is operating in the normal closed loop mode. However, since it is intended to bore an off-center hole, the following describes one means for arranging this:

(a) at terminals 230, 231, there is applied the reference-vector signal voltage, and it is coupled into transistor stage 235, a phase-inverter stage;

(b) components 236, 237, 238, 239, 240 form a phase-shift network which allows shifting the voltage appearing across potentiometer 241 by 90 electrical degrees either way (lead or lag) from the reference-vector signal;

(c) the arm 245 of potentiometer 241 controls the amplitude of the synthetic runout voltage which appears across terminals 242, 243;

(d) in FIG. 9 there is a box labelled "1-shot multivibrator." This circuit generates a square current pulse each time the work piece makes one complete rotation (bringing the reflective patch 66 in front of the photoelectric cell 65);

(e) FIG. 27 shows this multivibrator pulse applied to terminals 250, 251, and coupled thru 252 to turn ON transistor 253. Turning ON transistor 253 energizes magnet of escapement mechanism 254 which turns toothed wheel 255 proportional to the number of revolutions of the workpiece; and (f) since gear box 256 couples toothed wheel 255 mechanically to potentiometers 240 and 241 upon closing of switch 257 the potentiometer wipers move proportional to total revolutions of the workpiece.

Assume that:

(a) potentiometer wiper 245 is set at "zero" end (no output voltage);

(b) switch 257 is OPEN; and (c) a finite runout signal exists across terminals 220,221.

Under these conditions, the runout signal will appear unmodified at terminals 262, 263, causing a restoring force to appear at the boring-bar yoke which promptly returns the boring bar to the centerline-of-rotation of the workpiece, thereby wiping out the runout signal across terminals 262, 263.

If switch 257 is closed, wiper 245 will be driven upward, causing a small amount of phase-shifted reference-vector signal to appear across terminals 242, 243. Since the runout signal and the reference-vector signal are both sine waves having the same frequency, the system (from terminals 260 on) reacts exactly as though a real run-out signal were present. However, in this case the yoke force is such as to move the boring bar off of the centerline-of-rotation of the workpiece until the resultant real runout signal at terminals 220, 221, is exactly equal and opposite to the injected synthetic runout signal. When this occurs, radial movement of the boring bar ceases.

However, since arm 245 is being driven upward steadily, as the workpiece continues to rotate, the cutting head progresses steadily along the length of the workpiece, and the injected synthetic runout signal will be continually changing. In order for the electronic system to preserve null balance, the boring bar must continue to change position accordingly. Thus, the apparatus can deep-bore a cylindrical hole having a curved centerline.

By similar reasoning one may show that it is possible to deep-bore a circular hole which has a serpentine centerline, i.e., a centerline with arbitrarily selected curvature, simply by appropriately programming the motion of wipers 240 and 241 relative to the turning of toothed wheel 255 (which represents the position of the cutting head longitudinally along the workpiece, i.e., the "Z" position).

Figure 12:
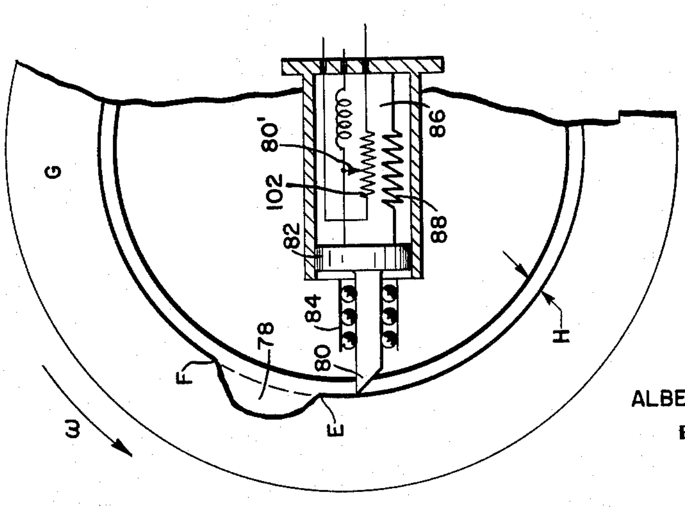
FIG. 12 is a simplified perspective view of the cutting tool used in an embodiment of the present invention.

Employing the basic principle of applying an input command signal having components of direction and magnitude to the bore, more sophisticated programming may be provided for by the device of the present invention, wherein axial and peripheral variations in pattern can be formed in the bore. It will be appreciated that the gun barrel is rotated while the cutting tool is moved only axially down the barrel. As shown in FIG. 12, the radial distance 78 of cutting bit 80 can be momentarily increased each time point E comes around, thus cutting a keyway into the interior surface of the barrel as the boring tool progresses along the axis of the work. The programming here involves imparting the necessary force to cutting bit 80 as it cuts into the work piece rotating at constant rotational speed past the cutting bit. The phase angle involved will be of rather narrow range, namely, between points E and F, with the required variation of radial distance of the cutting bit synchronized to that range of $\theta$ ($\overline{EF}$ as shown in FIG. 12). The required stroke of the cutting bit is obtained by means of a force device such as piston 82 (connected to bit 80 which rolls on balls 84) utilizing oil under pressure inside cylinder 86. As the oil pressure is increased, the bit will bite deeper radially into the work piece. As the pressure is decreased, spring 88 retracts the cutting bit. It will be appreciated that, if desired, the oil pressure can be on both sides of the piston and the spring eliminated, or a motor driven gear train and screw feed used instead. The timing and magnitude of the advance and retreat of the cutting bit is controlled by the programming system shown generally in FIG. 13.

Figure 13:
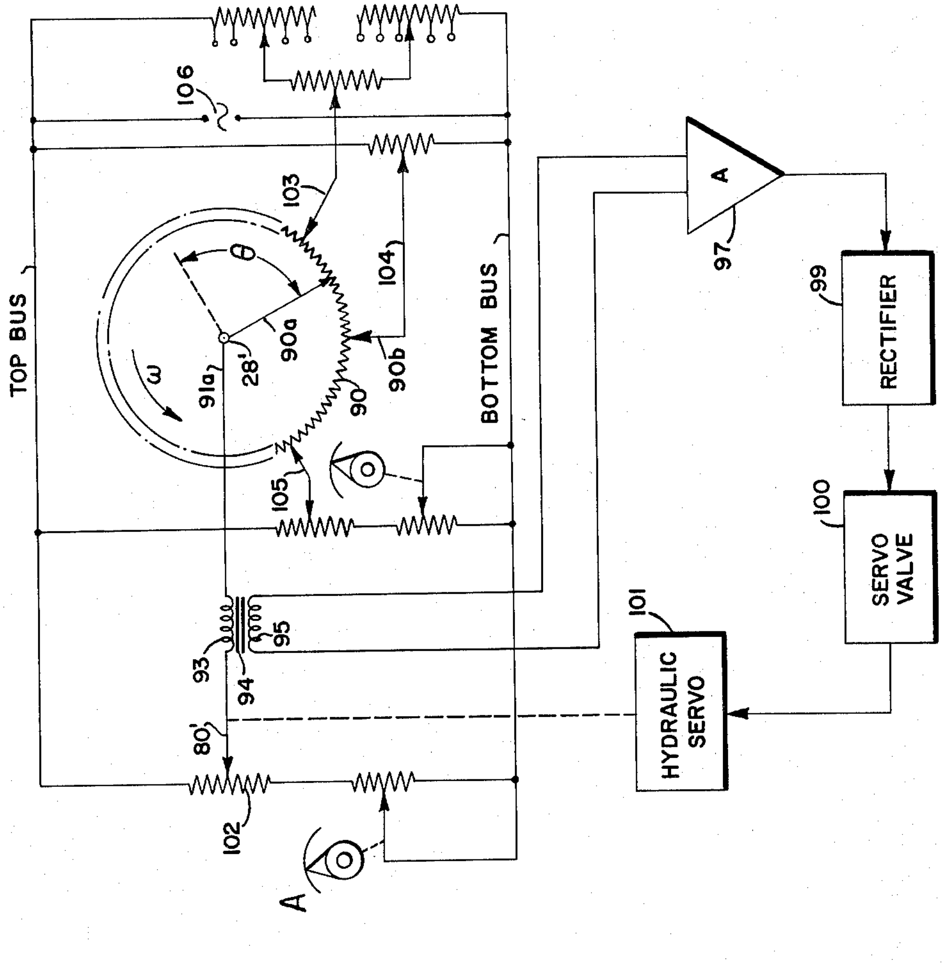
FIG. 13 is a diagrammatic representation of a programmer and servo loop used in an alternative embodiment of a device of the present invention.

As the gun barrel rotates, a reference vector voltage is generated, as described previously with reference to FIG. 9. Shaft 28' of FIG. 13 is slaved to this reference vector so that it rotates continuously in synchronism therewith. In its crudest form, the shaft of potentiometer 90 can be directly coupled mechanically to the muzzle end of the gun barrel being bored using a flexible shaft. If the stops of the potentiometer 90 are removed, then the shaft 28 and wiper 90*a* will rotate synchronously with the workpiece. There are other ways to accomplish this remotely, using, for instance, a selsyn transmitter on the muzzle end of the barrel and a selsyn receiver (with power servo and drive motor, if necessary) at a remote location to drive shaft 28 in synchronism with the rotation of the gun barrel or other workpiece. Since the reference vector is firmly locked to the workpiece (see FIG. 6 line from "O" thru reference 22 to "A"), then shaft 28 and the reference vector rotate in synchronism, it having been shown earlier that the reference vector does, in fact, rotate. Circular resistance winding 90 is programmed to contain a voltage distribution with respect to $\theta$ which determines the radial position of the cutting bit as a function of $\theta$. This voltage, appearing between line 91A and ground, is opposed by the voltage between line 80' and ground. An error voltage ($e$) appears across high impedance primary winding 93 of transformer 94 to the secondary 95, then is fed to amplifier 97. The output goes then to rectifier 99, as varying D.C., to servo valve 100 which controls flow of oil into servo 101. This servo corresponds to the piston 82 of FIG. 12 and positions the cutting bit 80, as well as the position-sensing potentiometer 102.

Hydraulic servo 101, being mechanically connected to wiper 80' of poteniometer 102, is a closed-loop system, will force this wiper to always seek a position along 102 winding which provides a voltage equal and opposite to the voltage appearing at line 91*a* (with respect to ground). If the "wipeout" voltage between 80' and ground differs in magnitude from the voltage between 91*a* and ground, then their difference will appear across winding 93. Since source 106 is shown as an A.C. source (say 400 cycles or 1000 cycles per second at 1 volt) the error voltage appearing at 93 will be transformed to secondary winding 95 and thence into the servo amplifier where it will open the servo valve to cause the hydraulic piston to change 80' so as to wipe out this difference. Potentiometer 102 in FIG. 13 is the same as potentiometer 102 in FIG. 12. The wiper 80' in FIG. 12 is mechanically connected to the piston 82, while the winding of 102 in FIG. 12 is bonded to the frame of the servo, i.e., the cylinder of the servo. This potentiometer is a linear potentiometer well adapted to sensing translational movement of the piston with respect to the cylinder which houses it. Leads from this linear potentiometer may be brought out thru the end of the cylinder, using hermetically sealed (leak-proof) feed-through connectors. These wires may be then run longitudinally along the side of the boring bar (or inside it, if preferable) until they exit the workpiece and are accessible for connection to the remainder of the servo apparatus outside.

The circular resistance winding 90 is programmed as follows:

Referring to FIG. 13, if wiper 90*b* were missing, and wipers 105 and 103 were exactly the same voltage with respect to ground, then as wiper 90*a* moved over the winding it would see everywhere a constant voltage. Wiper 80′ of pot 102 would adjust once to this same voltage, and there the system would stay . . . cutting tool 80 in FIG. 12 will therefore hold at a fixed radial distance from the centerline of the boring head and the boring tool will proceed to bore a hole of some fixed diameter. If there is now introduced wiper 90*b* to FIG. 13, say halfway between wipers 105 and 104, then assign it a voltage slightly larger than the other two wipers, the following sequence of events will occur. As wiper 90*a* moves counter-clockwise from wiper 105 toward 90*b* it will see a linearly increasing A.C. voltage until it reaches 90*b* then a linearly decreasing voltage until it reaches 103 (thereafter a constant voltage). As described previously, wiper 80′ of pot 102 will follow identically this voltage, and this means that the cutting tool 80 of FIG. 12 will therefore move radially outward linearly then radially back in linearly, thereby cutting (theoretically) a V-shaped keyway. The higher that wiper 104 of FIG. 13 is moved, the further out the cutting bit 80 of FIG. 12 will move, thereby cutting a deeper V groove. By providing a number of taps such as 90*b* along the circular potentiometer it is possible to approximate any reasonable voltage profile and therefore any reasonable keyway profile correspondingly. As an aid in this profiling, one may specify a non-linear winding of the potentiometer 90. Many variations can be effected here by those schooled in the art of voltage programming using potentiometers.

Let it be assumed now that, by some suitable motor-driven means, the winding 90 (FIG. 13) with its taps 105, 90*b*, and 103 in place is very slowly rotated about its own axis. Since shaft 28 is firmly attached to the workpiece, this means that the position of the groove or keyway will change with respect to the reference vector position on the workpiece and a workpiece and a spiral keyway will be formed.

Thus in this closed-loop system, the cuting bit follows the moderate peripheral contours programmed by the voltage distribution around resistance winding 90 of FIG. 13.

By gradually rotating resistance winding 90 with respect to taps 103, 104, 105, it is possible to cut a spiral keyway. Alternatively, the phase of the reference vector may be gradually shifted to produce the same effect. It will be appreciated by those familiar with the art that there are many possible arrangements for programming peripheral and axial profiles.

Up until the present, the problem of erratic runout with its un-predictable nature had made it unwise and unprofitable to do any peripheral internal contouring of the bored hole until one was very sure that the workpiece could actually be bored in a straight manner. With the advent of the apparatus disclosed herein the operator can be quite sure that this null-balance system will indeed follow the centerline contour which he desires, whether it be a straight-bored hole or even a serpentine-centered hole. Immediately, therefore it becomes practical for him to specify not only the centerline of the hole to be bored, but also the exact shape of the periphery of the bored hole in detail, that is, the radius R of the hole as a function of $\theta$ (angle from the reference direction) and $z$ the distance longitudinally along the barrel. This would be some single-valved analytic function thus: $R=f(\theta, z)$. The only reason he can now specify this internal contour is that, using the presently disclosed system, he can be sure that the specified centerline will be adhered to, from which all values of R are referenced. In fact, there seems to be no practical reason why the boring head which does the internal-surface contouring cannot ride directly behind the boring head which bores the initial cylindrical hole. In fact, if the cuts required are not too deep one boring head can perform both jobs easily. However, without some means of being sure of the proper execution of the specified centerline, there is no sense attempting additional internal contouring Programmed internal contouring follows directly from and is directly dependent upon the capability of the instant system. No accurate programmed internal-surface contouring can be performed from an indefinite centerline. Thus the relationship of the internal contouring system to the present runout control system is shown.

Figure 14:
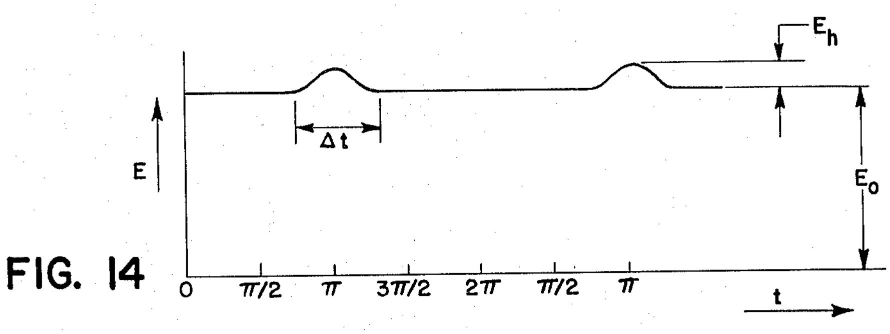
FIG. 14 is a graph of voltage plotted against radians of rotation angle in a device of an alternate embodiment of the present invention.

It is envisioned in the present invention to develop keyway type programming voltages by a method which utilizes Fourier series. FIG. 14 graphically displays such a "keyway" voltage. This voltage may be considered as composed of a D.C. value $E_0$ (corresponding to the normal cutting radius, $\overline{OH}$ of FIG. 12) plus an A.C. component (the "hump" voltage) $E_h$, shown as the section EF in FIG. 12. In essence, the "hump" voltage is injected once each revolution of the barrel. This hump voltage is generated by combining selected amounts of a fundamental sine wave and its harmonics to form the desired hump voltage. This may be accomplished as shown in FIG. 14, and by means of the associated electrical circuits, illustrated in FIGS. 15–17.

Figure 15:
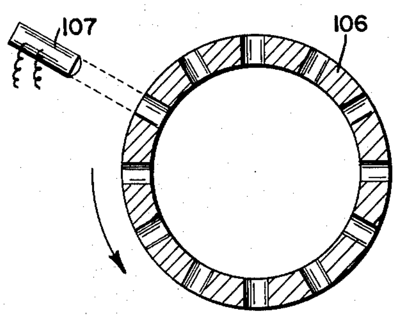
FIG. 15 is a simplified representation of the photo scanning means used in an alternate embodiment of the present invention.
Figure 16:
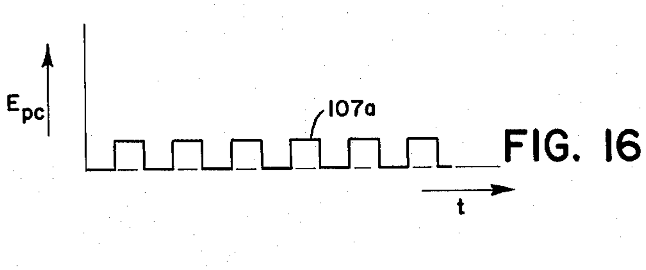
FIG. 16 is a graph of the output of the photocell of FIG. 15, shown as a train of square waves.
Figure 17:
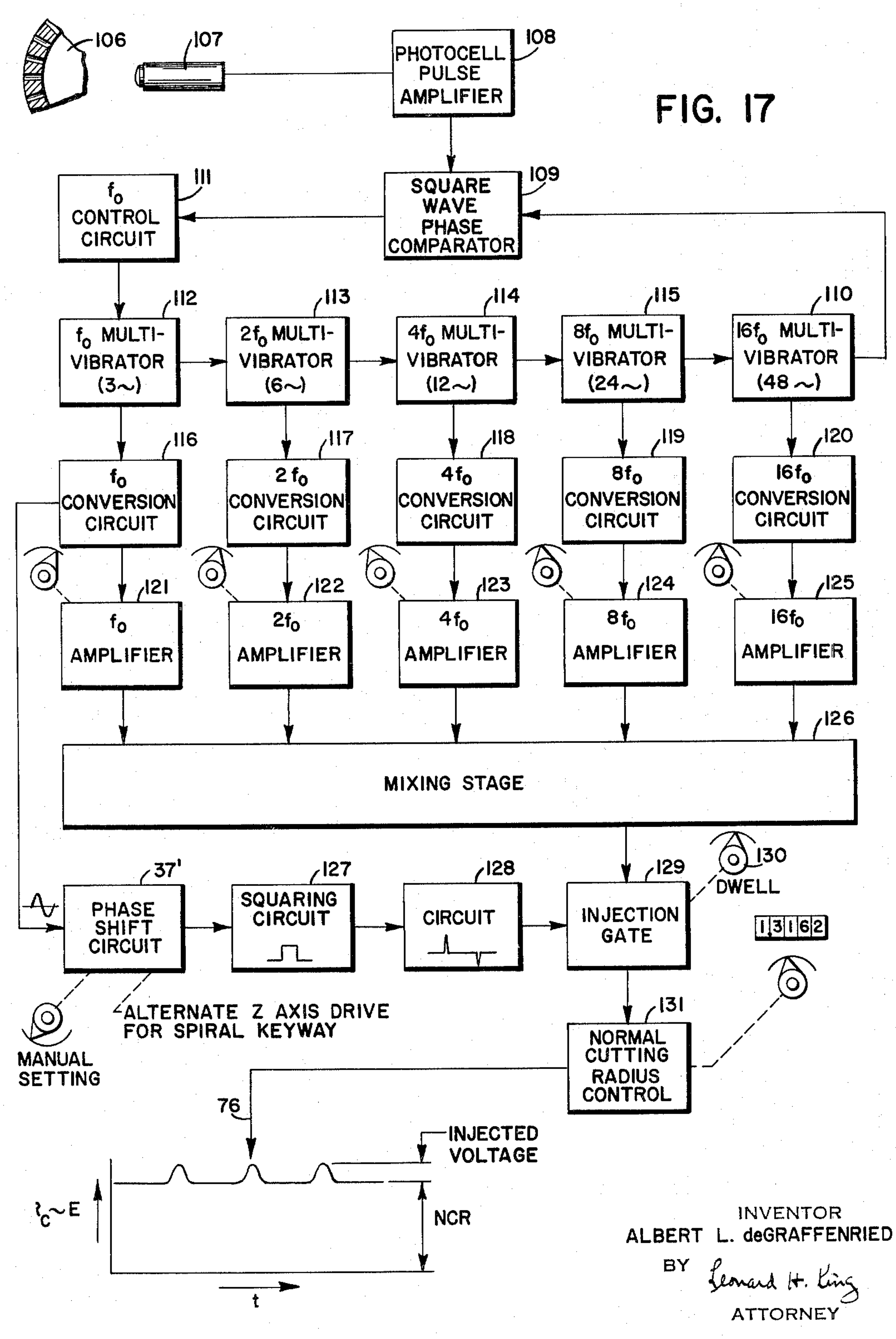
FIG. 17 is a diagrammatic representation of the circuit for generating subharmonics as employed in a device of the present invention.

FIG. 15 shows a fluted disc 106 which is viewed by a photocell 107. Disc 106 is mounted on the powder-chamber end of the barrel. Photocell 107 generates a succession of square waves 107*a* (FIG. 16) at a frequency which is an integral multiple of the barrel rotational frequency $f_0$. As shown in FIG. 17, the pulses from photocell 107 are fed through amplifier 108 into square-wave phase comparator 109. This circuit compares the individual pulses from the photocell with those coming from multivibrator 110, having the same frequency as that of disc 106. If the two trains get slightly out of step, comparator 109 produces a proportional voltage, feeds it to a control circuit 111, which corrects the frequency of multivibrator 112, which is the frequency before multiplication, namely, the barrel rotational frequency $f_0$. This action brings the two trains back in step and locks them in step, since the output of multivibrator 110 is the required harmonic of $f_0$, from multivibrator 112. As shown in FIG. 17, the frequency is progressively doubled. For purposes of illustration, the frequency is progressively doubled from 3 cycles to 48 cycles, by frequency doublers 113, 114, 115 and 110, which are conventional multivibrators. Each of these M-V boxes provides a square wave output voltage. Filter circuits 116–120 reduce these square waves to sine waves by essentially low-pass action. The amount of each individual harmonic which is mixed into the final wave form is controlled by amplifiers 121–125 and fed to mixer stage 126. This hump voltage is injected only once each revolution. Its injection is timed by phase-shifting the reference sine wave 35 of FIG. 2 either manually or automatically, as indicated by phase shifting circuit 37′ in FIG. 17. This wave is squared by circuit 127, then differentiated by circuit 128 to get a triggering pulse to trigger the injection gate 129. This is a one-shot multivibrator with manual dwell ($\tau$) control 130. This injected hump voltage is added to the normal cutting-radius control-voltage 131 and the resultant voltage fed to the radial-tool-feed servo, replacing the programmed resistance wire 90 of FIG. 13. Alternatively, by means well known in the art, first, second, third, etc., harmonics can be generated quite simply using a driven shaft having toothed wheels thereon (not shown). This type of harmonic generator is conventionally used in contemporary electronic organs. The shaft can be slaved to the barrel speed or reference vector.

The purpose of the comparator 109 of FIG. 17 (the square wave phase comparator) is to lock $f_0$ from control circuit 111 in synchronism with the reference vector voltage very accurately. Alternately, one could have used the reference vector signal voltage itself if desired. One can assume, therefore that $f_0$ will not even be out of synchronism with the rotation of the workpiece. One may therefore adjust the phase shift control of phase shift circuit 37' until the injection gate opens at an instant corresponding to point E of FIG. 12. Similarly, dwell control 130 of FIG. 17 may be set so that the injection gate closes at an instant corresponding to point F of FIG. 12. This set of adjustments assures that there will be no keyways cut at any other peripheral positions, regardless of what signals come out of the mixing stage. The above adjustments can be performed by observing the system on suitable cathode ray oscilloscope, or simply by watching the cutting bit movement before the boring head enters the power-chamber end of the barrel. The former method is more precise, but the latter is more easily done by a machinist. The shape and depth of the cut is then determined by how much of each harmonic is mixed in at what phase angle. For maximum freedom of Fourier composition, amplifiers 121, 122, 123, 124 and 125 should also show phase shift controls as well as amplitude controls (now visible). With regard to phase shift circuit 37' of FIG. 17, once the manual setting control is adjusted for the proper phase of the injection pulse, then locked, no synchronization problem any longer exists.

Concerning the mixing stage, one conventional arrangement is shown in FIG. 17 wherein all the output voltages of the boxes 121, 122, 123, 124 and 125 are connected in series and applied directly to the input of the injection gate. In such an arrangement, the individual Fourier components simply add arithmetically at any instant as summed voltages. This mixing stage is not to be confused with the "mixer" stage in a superheterodyne receiver. The mixer stage in a superheterodyne radio receiver is purposely a non-linear stage in order to produce sum and difference frequencies. The mixer stage here is required to be linear in its action and produces no sum or difference frequencies. Its action is a simple linear addition, at any instant, of all the instantaneous amplitudes of the signals introduced via the above-mentioned series connection.

Figure 18:
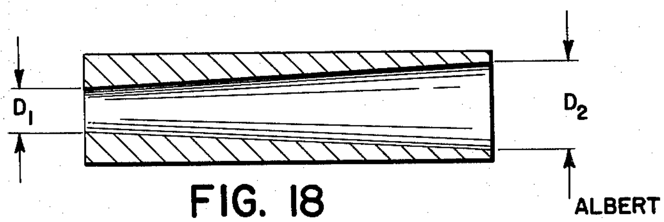
FIG. 18 is a simplified side view of a taper formed by a device of the present invention.

Utilizing the device of the present invention, it is possible to bore a hole having a radius which gradually changes with axial distance, as shown in FIG. 18. In this case, it is necessary simply to slave control A of FIG. 13 to the Z-axis drive, i.e., by a shaft which moves in synchronism with the axial progress of the boring tool, by means well known in the art.

During deep boring the cutting bits generate considerable torque about the centerline of the boring bar. As the bore deepens, the slenderness of the boring bar is such that the aforesaid torques can cause noticeable torsional deflections of the cutting head. Ordinarily, these torsional deflections will cause rotation of the stator of the aforementioned rotary variable differential transformer and therefore show up, falsely, as a runout signal. One very effective way to avoid such errors is to mount the run-out sensing element on a gimballed frame, which is common with a gyroscope which has its axis of spin perpendicular to the axis of the boring bar. As the boring bar twists, under the torques imposed by the cutting bits, the sensor will be torsionally stabilized by the gyroscope, and therefore will not register false run-out values. Such gyro-stabilized sensors are very useful for large-diameter bores usually associated with slow rotational speeds of the machine.

There has been disclosed heretofore the best embodiment of the invention presently contemplated and it is to be understood that various changes and modifications may be made by those skilled in the art without departing from the spirit of the invention.

What is claimed is:

1. A boring device for deep boring an object rotating about an axis, comprising:

a boring tool adapted to be advanced substantially parallel with said axis and including a cutting head for cutting the interior of said rotating object;

means for advancing said boring tool;

means adapted to sense the direction and magnitude of the run-out from said axis to the center of a bored hole made by said cutting head, said sensing means being adapted to generate a run-out signal indicative of said magnitude and direction, whereby the position of the boring tool relative to said axis may be determined;

force generating means adapted to provide a force acting on the cutting head to cause radial displacement of said cutting head responsive to said run-out signal whereby said run-out may be controlled in direction and magnitude.

2. The apparatus of claim 1 wherein said force generating means are hydraulic means.

3. The apparatus of claim 1 wherein said force generating means are pneumatic.

4. The device of claim 1 including a programming means for providing a command signal and wherein said force generating means are under the joint control of said means responsive to said run-out signal and said command signal.

5. A device as in claim 1 wherein said means to generate a run-out signal comprise movable means mounted on said boring tool for sensing movement of the boring tool, whereby upon said boring tool being subjected to run-out, the center of said boring tool orbits about the said center line and imparts oscillatory motion to said movable means, and electrical means responsive to the movement of said movable means for indicating the existence and degree of run-out, wherein said movable means includes a pendulum member hingedly mounted on the center line of said boring tool and vibrating in response to the orbital motion of said boring tool, and wherein said electrical means include a rotary variable differential transformer, wherein said transformer is sinusoidally modulated by said pendulum swings.

6. A device for controlling the deep boring of an object rotating about a predetermined axis and in engagement with a cutting head comprising:

a boring tool adapted to be advanced approximately in parallel with said center line and including said cutting head;

means for axially advancing said boring tool along the axis;

means mounted on said boring tool adapted to sensing the direction and magnitude of the run-out from said axis to the center of the bored hole made by said cutting head, said sensing means being adapted to generate a run-out signal indicative of said magnitude and direction, whereby the position of the boring tool relative to the axis may be determined;

electromagnetic means disposed proximate to said boring tool, said electromagnetic means being adapted to generate a force and thereby radially displace said boring head and said rotating object relative to each other upon energization of said electromagnetic means; and means responsive to said run-out signal to selectively impart such energization whereby said displacement of said cutting head and said rotating object relative to each other may be controlled in direction and magnitude.

7. The device of claim 6 including supplemental command signal generating means connected to said last named responsive means whereby said displacement is a function of said run-out signal and said command signal.

8. A device as in claim 6 wherein said electromagnetic means comprise a plurality of electromagnets disposed circumferentially in spaced relationship about the said boring tool proximate to said cutting head to define a control yoke, said electromagnets adapted to be sequentially energized by phase-splitting means whereby a rotating magnetic field is generated in said control yoke at a frequency equal to the rotational frequency of said rotating object, whereby said cutting head and object are adapted to be moved relative to each other in a direction and magnitude set by said phase-splitting means and whereby said command signal is adapted to be connected to said phase-splitting means to thereby control said movement.

9. A device as in claim 8 wherein said phase-splitting means comprise a quadrature-type phase splitting circuit adapted to split the said input command signal in four equal components differing in phase by 90 electrical degrees, and wherein said control yoke comprises four electromagnets arranged in spaced quadrature about the shaft of said boring tool proximate to said cutting bit.

10. A device as in claim 8 wherein said phase-splitting circuit is provided with a plurality of trimmer potentiometers, one of said respective potentiometers being in electrical connection with each of said electromagnets, said potentiometers being adapted to adjust the phasing of current in said electromagnets.

11. A device as in claim 7 wherein said command signal is adapted to be derived from said reference signal by phase-shifting network means applied to said reference signal to define a command signal having the frequency of said reference signal as determined by the rotational frequency of said rotating object, and selectably displaced from a selected reference point by said phase-shifting network.

12. A device as in claim 7 wherein said command signal is adapted to be derived from said run-out signal by phase-inverting means, whereby said run-out signal is converted to a second signal of equal magnitude and opposite phase to define a restoring force signal adapted to be connected to said actuating means, to thereby urge said cutting head in a direction diametrically opposite to said run-out location point and thereby move said cutting head towards said center line.

13. A device as in claim 7 wherein said device is provided with visual display means, said visual display means including a cathode ray oscilloscope tube adapted to display a reference signal, said command signal, and said run-out signal simultaneously on the face of said tube, said respective signals being operatively connected to the horizontal and vertical amplifiers of said oscilloscope, whereby said command signal and said run-out signal are displayed with reference to said reference signal in polar coordinate configuration corresponding to the physical correlation of said signals within the rotating object.

14. A device as in claim 7 wherein said device is provided with visual numerical display means, whereby said reference signal, said run-out signal, and said command signal are adapted to be converted to visual numerical readout displays having numerical values corresponding to the magnitude and direction of said respective signals relative to each other.

15. A device as in claim 7 wherein said cutting head is provided with force means adapted to displace said head transversely relative to the shaft of said boring tool, said force means being responsive to a separately supplied command signal, whereby said cutting head is adapted to form keyways in said rotating object.

16. A device as in claim 7 including programming means adapted to provide a preselected variable voltage characteristic to said command signal, said programming means comprising a circular resistance winding wherein said winding is selectively arranged to provide a voltage distribution adapted to energize said actuating means in preselected timed ratio to the position of said rotating body relative to said cutting bit.

17. A device as in claim 16 wherein said voltage characteristic is generated by Fourier series means whereby a multiplicity of sine waves in harmonic relationship to each other are mixed to define said input signal, said signal being injected in preselected ratio to said rotation of said rotating object, whereby said input signal is given a characteristic determined by said Fourier series.

18. A device as in claim 16 wherein said command signal controlling said actuating means is in preselected timed relation with said movement of said boring tool longitudinally through said rotating object by ganged potentiometer means wherein one of said potentiometers is programmed to define the input command signal to said actuating means, and the second potentiometer is programmed to define the rate of longitudinal movement of the boring tool through the rotating object.

19. A device as in claim 16, wherein the programming of said actuating means relative to the longitudinal movement of said boring tool is a curve follower device wherein the said input signal is derived from a curve representing the desired magnitude and direction of movement of said boring tool transversely with reference to the longitudinal movement of said boring tool.

20. A device for controlling deep boring operations in a rotating object comprising:

a boring tool adapted to be advanced substantially along the axis of rotation of said object and including a cutting head for cutting the interior of the rotating object;

means to generate a wave train having a frequency directly proportional to the frequency of said rotating object and keyed to a selected reference point on the periphery of said rotating object to define a reference signal;

sensing means mounted on said boring tool adapted to sense the direction and magnitude of tool run-out with respect to said axis of rotation, said sensing means adapted to generate a run-out signal responsive to said magnitude and direction;

means to simultaneously display said run-out signal, said restoring force signal, and said reference signal, to thereby indicate the position of said run-out signal relative to said reference signal;

phase-shifting means adapted to shift a portion of said reference signal a preselected angular displacement relative to said run-out signal to define a restoring force signal;

electromagnetic means disposed proximate to and circumferentially about said boring tool and adapted to induce magnetic attraction between said rotating object and said boring tool upon energization of said electromagnetic means;

means for generating a restoring force signal;

means for energizing said electromagnetic means with said restoring force signal; and whereby said boring tool is displaced in a direction and magnitude tending to minimize the generated run-out signal.

21. A device as in claim 20 wherein said sensing means include movable means mounted on said boring tool for sensing movement of the boring tool, whereby upon said boring tool being subjected to run-out, the center of said boring tool orbits about the said center line and imparts oscillatory motion to said movable means, and electrical means responsive to the movement of said movable means for indicating the existence and degree of run-out, wherein said movable means include a pendulum member hingedly mounted on the center line of said boring tool and vibrating in response to the orbital motion of said boring tool, and wherein said electrical means include a rotary variable differential transformer, wherein said transformer receives a sinusoidal modulation by said pendulum swings.

22. A device as in claim 20 wherein said reference signal means comprise optical scanning means arranged to detect indicia carried by said rotating object and producting a reference signal.

References Cited by the Examiner

UNITED STATES PATENTS 3,020,786 2/1962 De Graffenried et al. ---- 77—3

WILLIAM W. DYER, Jr., *Primary Examiner.*

FRANK E. BAILEY, *Examiner.*